April 4, 1961
D. C. KALBFELL
2,978,694
MAGNETIC COMMUTATOR AND MEASURING APPARATUS
Filed April 15, 1957
2 Sheets-Sheet 1
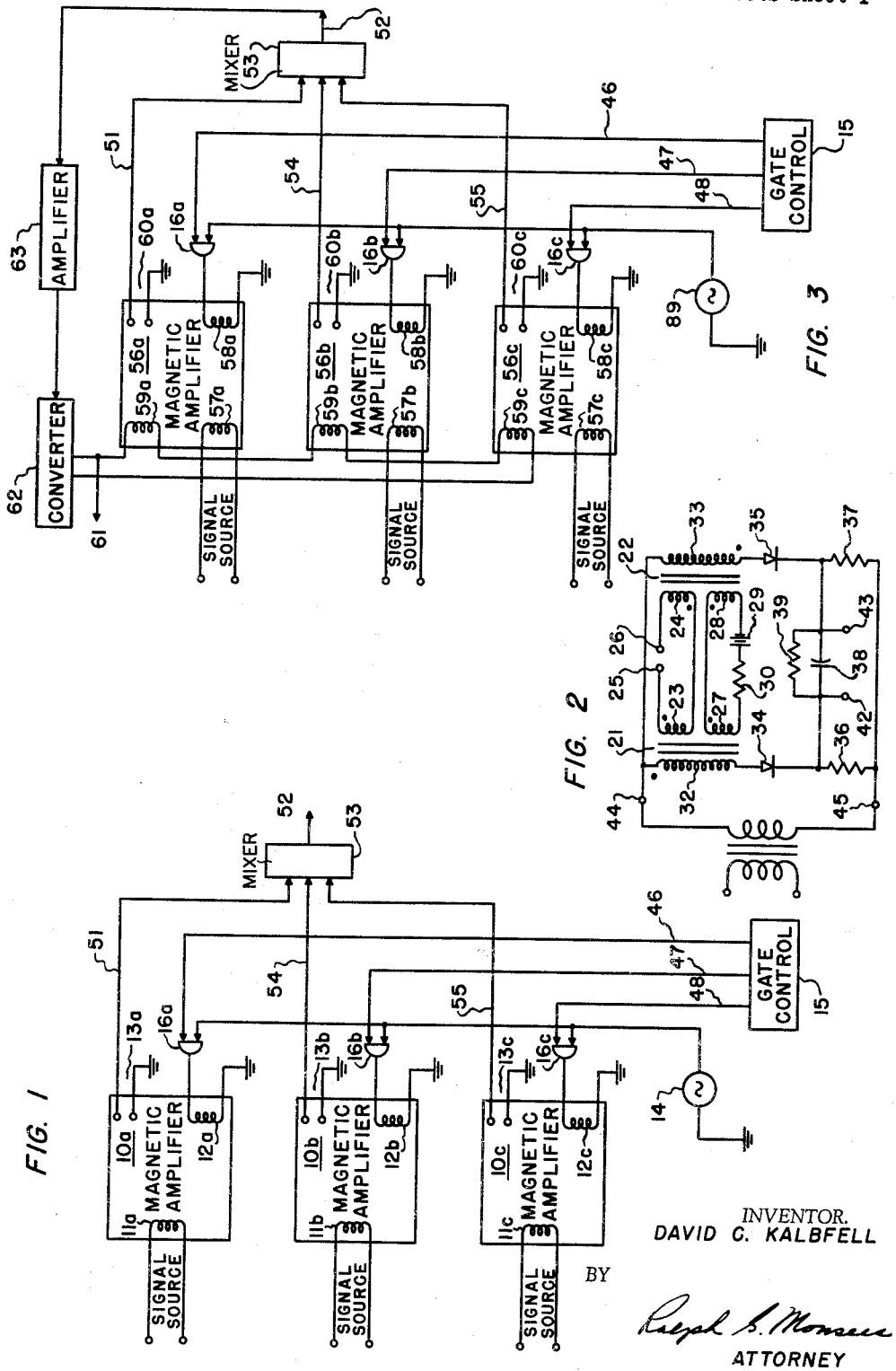
INVENTOR.
DAVID C. KALBFELL
BY
ATTORNEY April 4, 1961  D. C. KALBFELL  2,978,694
MAGNETIC COMMUTATOR AND MEASURING APPARATUS
Filed April 15, 1957  2 Sheets-Sheet 2
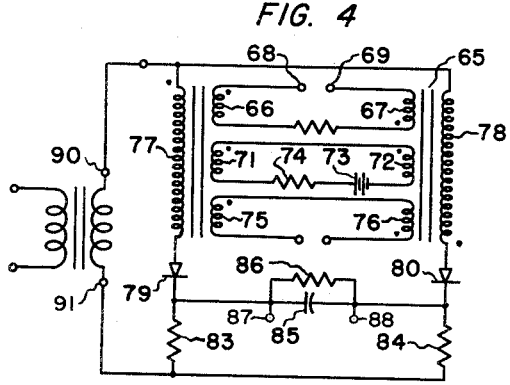
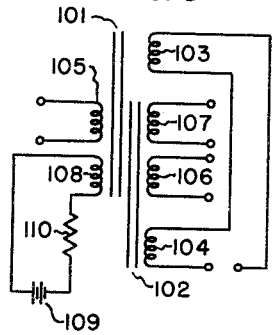
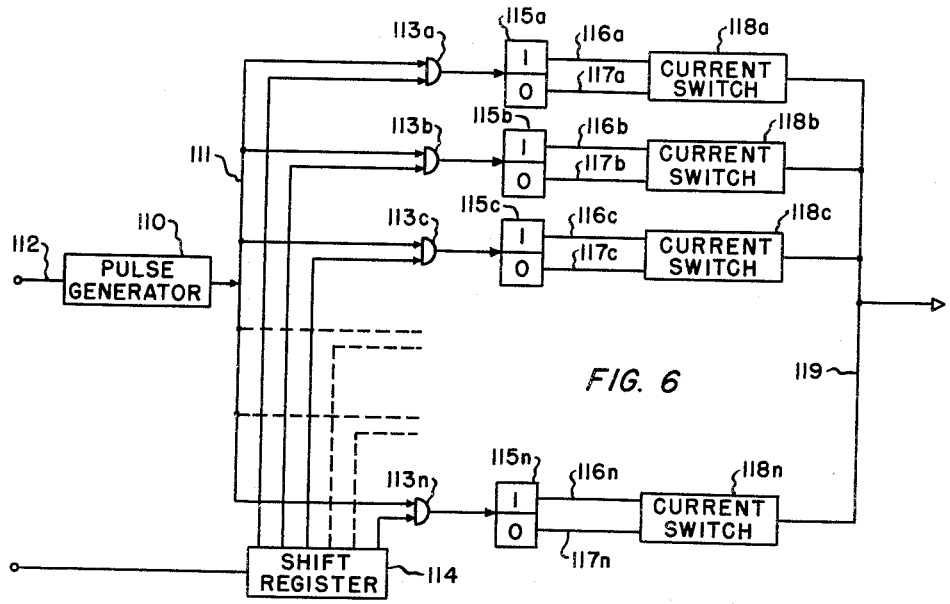
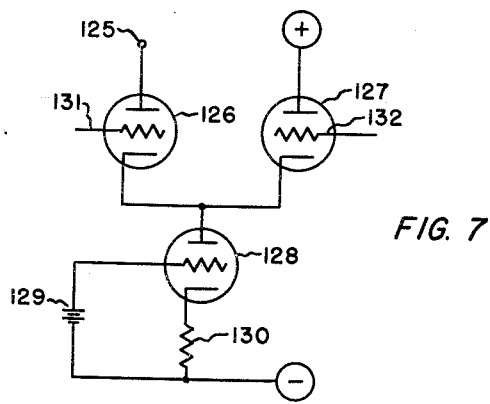
INVENTOR.
DAVID C. KALBFELL
BY
Ralph G. Monsees
ATTORNEY United States Patent Office 2,978,694
Patented Apr. 4, 1961

2,978,694

MAGNETIC COMMUTATOR AND MEASURING APPARATUS

David C. Kalbfell, 941 Rosecrans St., San Diego 6, Calif.

Filed Apr. 15, 1957, Ser. No. 652,969

11 Claims. (Cl. 340—347)

This invention relates generally to a system for sequentially measuring a plurality of input signals and more particularly to a system utilizing magnetic amplifying means for commutating a plurality of input signals sequentially and indicating the magnitude of the signals in time sequence on a common output terminal.

Systems for commutating as well as those for both commutating and measuring a plurality of signals find considerable application in automatic control equipment, data handling systems, data processing and telemetering. Mechanical commutators, or scanners as they are sometimes called, have been used heretofore in many applications of the aforementioned systems. However, mechanical commutators are known to have certain disadvantages. For example, characteristic of most mechanical devices, the moving parts are subject to wear, foreign substances such as dust and dirt find their way into the moving mechanical elements, and reliable operation is further impaired by their susceptibility to temperature, acceleration and other environmental conditions to which these systems are generally exposed. Mechanical commutating systems are also relatively large and require a comparatively large amount of electrical power to drive them. Moreover, and of considerable importance is the limited rate at which each of the plurality of channels can be scanned by the mechanical system even when such systems approach this limit the commutator becomes short lived due to the wear of contacting elements.

Electronic commutating systems have overcome many of the disadvantages of the mechanical systems, but have certain important limitations which are not found in the present invention. The most practical electronic systems generally utilize a diode matrix in which the diodes are normally of the germanium or silicon type. These diodes have a minimum signal threshold of approximately ten millivolts. Since this threshold level is about the full scale voltage that is developed by the average transducer, preamplifiers are required. A great deal of space, as well as expense, is involved where a preamplifier is required for each transducer. Chopper stabilized preamplifiers are generally used in such applications and due to their relatively high cost it is common practice to use one group of preamplifiers for different groups of transducers. This is accomplished by incorporating a mechanical switching system with the preamplifiers so that the one group of preamplifiers may be used successively. Thus, a mechanical switching system is combined with the electronic scanner. This, of course, has the disadvantages of the mechanical commutators in addition to added cost of the preamplifiers and other necessary circuitry.

A magnetic commutator and indicating system which also sequentially samples voltages from a plurality of sources overcomes many of the disadvantages of the systems heretofore utilized. For instance, my magnetic commutator has no moving parts but is much less expensive to construct and maintain than electronic systems. It is capable of effective operation at much higher scanning rates than mechanical systems and has advantages of size, weight, reliability and ruggedness over comparable electronic commutating systems.

It is therefore an object of the present invention to provide a high speed commutating system utilizing magnetic amplifiers as switching elements whereby voltages from a plurality of independent sources are successively read and transferred to an output terminal in time sequence.

Another object is to provide a commutator having the reliability, operational and environmental advantages of magnetic circuits.

Another object of the present invention is to provide a system in which a multiplicity of input signals applied on separate lines are accurately reduced to a single output line without the necessity for linear switching.

Another object is to provide a system for sequentially switching a plurality of input signals to a common output without interrupting the input or output signals.

Another object of the present invention is to provide an improved high speed system for sequentially commutating and measuring a plurality of input signals and producing serial time sequental indications on a single output terminal.

Another object is to provide a reliable, lightweight commutating and measuring system in which neither the input signals nor the output signals are switched during the process of sequentially commutating and measuring the plurality of signals.

Another object of the present invention is to provide a high speed commutating system in which a plurality of independent voltages are sampled and a digital output is developed corresponding to each of the voltages.

Other objects and features of the present invention will be readily apparent to those skilled in the art from the following specification and appended drawings wherein is illustrated a preferred form of the invention, and in which:

Figure 1 is a block diagram illustrating the commutating system of the present invention wherein magentic amplifiers are utilized as switching elements to successively read voltages from a plurality of independent sources.

Figure 2 is a circuit diagram of a magnetic amplifier that may be utilized in connection with Figure 1.

Figure 3 is a block diagram illustrating a system for sequentially commutating a plurality of input signals and producing serial time sequenital signals that are a measurement of the input signals.

Figure 4 is a schematic diagram illustrating a magnetic amplifying circuit that may be used in connection with Figure 3 for producing analog output indications.

Figure 5 is a schematic diagram illustrating a magnetic amplifying circuit that may be used in the system shown in Figure 3 for producing digital output indications corresponding to the input signals.

Figure 6 is a diagrammatic illustration of a converter unit utilized in the system shown in Figure 3.

Figure 7 is a schematic diagram of a current switch utilized in the converter unit of Figure 6.

Referring to Figure 1 which illustrates an embodiment of the magnetic commutating system of the present invention, magnetic amplifiers 10a, 10b and 10c are shown in block diagram form. The term "magnetic amplifier" is intended to mean a device using saturable reactors either alone or in combination with other circuit elements to secure control or amplification and which are based upon the process of magnetizing a core by a periodically varying magnetomotive force and by a simultaneously applied unidirectional magnetomotive force.

Although only three amplifiers, 10a, 10b and 10c, are shown in the drawings it should be understood that the present invention is not limited in this regard. It is contemplated that as many as several hundred channels will be utilized with each information channel including a magnetic amplifier such as 10a, 10b or 10c. The magnetic amplifiers serve not only as switching elements but also serve to amplify the associated input signal and include input windings 11a, 11b and 11c, carrier windings 12a, 12b and 12c, and output leads 13a, 13b and 13c. A source of carrier power 14 is provided which serves to furnish the power to the various magnetic amplifiers. Carrier source 14 may be an oscillator or other power supply for producing the desired alternating current, which may be 60 cycles, 400 cycles or other desired frequency.

Means for sequentially applying carrier power to the magnetic amplifiers is provided in the form of a gate control circuit 15 and gating circuits 16a, 16b and 16c which are interconnected between the source of carrier current 14 and windings 12a, 12b and 12c, respectively. The particular form of gating circuit forms no part of the present invention. Any one of the conventional "AND" gates commonly used in pulse systems will suffice. Moreover, as will be apparent, a simple form of saturable reactor also may be utilized. As shown, each gate has a pair of input terminals and a single output terminal, which is connected to its associated carrier winding of a particular magnetic amplifier. The source of carrier power 14 is connected in parallel to one input terminal of each of the gates 16a, 16b and 16c. The other input terminal is connected to the gate control circuit 15. The gates 16a, 16b and 16c are so designed that each remains closed and carrier current is blocked from the carrier winding of the amplifier unless current appears simultaneously on both input terminals. Inasmuch as the source of carrier current 14 is continuously applied to one terminal of each of the gates, the application of carrier power to any particular magnetic amplifier is controlled by gate control circuit 15.

Gate control 15 serves to selectively switch carrier power to the magnetic amplifiers 10a, 10b and 10c and may be in the form of a stepping switch for relatively slow speed applications. However, gate control 15 is preferably a pulse timing circuit, such as a ring counter or a simple shift register such as the one described in "High Speed Computing Devices" published by McGraw-Hill Book Company, 1950, page 299, which serves to generate a chain of high speed, timed impulses in the output of the register. A single pulse is sequentially produced by gate control 15 on each output terminal and each pulse is applied over a separate lead to an input terminal of one of the gate circuits. With carrier current continuously applied in parallel to the other input terminals of each gate, carrier current is thereby sequentially applied to the control windings of the magnetic amplifiers in accordance with the condition of the shift register. Thus, it may be seen that carrier power is applied to but a single magnetic amplifier at a time and at this particular time all other gates are not energized and carrier power is blocked from these amplifiers. The sequence of energizing the magnetic amplifiers through their associated gating circuits is determined by the interconnection between the gates and the shift register. In the event that the switching sequence is desired to be changed it is only necessary to change appropriate connections between the output terminals of the register and the gating circuits.

Magnetic amplifiers 10a, 10b and 10c serve not only as switching elements but also serve to amplify the input signals from the various signal sources. Figure 2 is a circuit diagram of a magnetic amplifier that may be used in the blocks denoted by reference numerals 10a, 10b and 10c. The magnetic amplifier of Figure 2 includes a pair of saturable cores 21 and 22. A pair of input windings 23 and 24 are carried by the cores 21 and 22, respectively, and are connected in series with respect to input terminals 25 and 26. A pair of biasing windings 27 and 28 are provided on the cores and are serially connected with a source of unidirectional current 29 and a biasing resistor 30 which serve to magnetically bias the cores 21 and 22. A pair of carrier windings 32 and 33 are also carried by cores 21 and 22. Rectifiers 34 and 35 with resistors 36 and 37 are serially connected to the carrier windings 32 and 33, respectively. One side of the load resistors 36 and 37 are directly interconnected and the other side of each load resistor is interconnected through a filtering network including a capacitor 38 and resistor 39. The output of the amplifier is developed across the terminals 42 and 43. Carrier power from a source, such as 14, furnishes the primary power to the magnetic amplifier and is applied across the terminals 44 and 45, and in turn through the windings 32 and 33, rectifiers 34 and 35, and load resistors 36 and 37.

In operation, signal source current applied via input terminals 25 and 26 to input windings 23 and 24 alters the effective permeability of cores 21 and 22 and thereby controls the reactance of windings 32 and 33 carried by the cores. Hence, the input signal serves to control or modify the transfer of carrier energy to the output terminals. The magnetic amplifier of Figure 2 is well known in the art and generally is of the type described in "Magnetic-Amplifier Circuits" published by McGraw Hill Book Company, 1954, page 190 to which reference may be had for further circuit details and operation.

Referring once again to the magnetic commutator illustrated in Figure 1, input signals developed by transducers, sensing instruments, or from some other desired source are separately applied to input windings 11a, 11b and 11c. The input signals are continuously applied to their associated input winding of one of the magnetic amplifiers. Carrier power 14 is supplied simultaneously to one terminal of each of the gating circuits 16a, 16b and 16c. The other input terminal of each gate is connected to the output leads 46, 47 and 48 associated with the gate control circuit 15 and when a pulse developed by the gate control circuit is successively applied over the leads to the gating circuits, carrier power is correspondingly applied to the magnetic amplifiers. For example, when a pulse appears on terminal 46, carrier power is applied to amplifier 10a and the signal applied to the input windings 11a is amplified and appears across output terminals 13a.

The voltage appearing in the output of amplifier 10a is carried by a lead 51 to a common output terminal 52 via a mixing network 53. The exact form of network 53 will depend upon the type of magnetic amplifier being employed. Where the output circuits of the inactive amplifiers present a high impedance, the mixing network 53 will simply consist of a junction point to which all the output leads, such as 51, are connected in parallel. On the other hand, if the inactive magnetic amplifiers present a low output impedance the output leads may be connected in series.

Subsequently, the pulse generated by gate control 15 on line 46 will be transferred to line 47 whereupon amplifier 10a is switched off and amplifier 10b is energized through the application of carrier power from source 14 through gate 16b to carrier winding 12b. The input signal appearing on input windings 11b is amplified and appears on output terminals 13b where it is transferred over lead 54 to the common output terminal 52. After a predetermined period, the gate control pulse will be switched to lead 48 whereupon magnetic amplifier 10b is turned off and amplifier 10c is energized. As in the case of amplifiers 10a and 10b, the signal applied to the input windings of amplifier 10c is amplified and switched over a lead 55 to the common output terminal 52.

Although only three input channels with their associated magnetic amplifiers have been described, it will be apparent that any reasonable number of signal channels can be sequentially amplified and transferred to the common output terminal. The common output terminal may be connected to further stages of amplification, directly to a voltage indicating instrument or may be connected to other equipment. At this point, however, the commutation has been effected.

It should be noted in the aforedescribed magnetic commutator that the plurality of input signals has been amplified as well as commutated to a single output line and neither the input nor output signals has been switched, commutated or interrupted but have remained continuously applied to the system thereby minimizing the possibility of introducing switching errors.

In the magnetic commutator hereinbefore described, the accuracy was no better than the linearity of the magnetic amplifiers. Accuracy can be improved by use of negative feedback. In this case, the magnetic amplifier is essentially a null detector, and sensitivity becomes more important than linearity. The use of non-linear amplifiers can result in a much more sensitive amplifier and also affords high accuracy in the ultimate measurement.

Figure 3 illustrates a system for sequentially commutating and measuring a plurality of input signals and producing serial time sequential indications on a single output terminal. The magnetic commutator is similar to that described hereinbefore and includes magnetic amplifiers 56a, 56b and 56c, one for each voltage to be commuted. The magnetic amplifiers include input windings 57a, 57b and 57c, carrier windings 58a, 58b and 58c, reference or feedback windings 59a, 59b and 59c and output terminals 60a, 60b and 60c. The output of this system is developed at terminal 61. The output may be taken as a voltage across the feedback windings, or as the current flowing through the feedback windings. Since the feedback windings are all connected in series, the feedback current matches the signal current of whichever magnetic amplifier happens to be energized through the gate control system. For an analog feedback system, the block labeled converter can be eliminated and the output of the amplifier is applied directly to the feedback windings 59a, 59b and 59c.

Circuit details of a typical magnetic amplifier which may be utilized in the blocks 56a, 56b and 56c of the analog feedback system is illustrated in Figure 4. As shown, the magnetic amplifier includes a pair of saturable cores 64 and 65. A pair of input windings 66 and 67 are carried by the cores 64 and 65, respectively, and are connected in series with respect to input terminals 68 and 69. A pair of biasing windings 71 and 72 are provided on the cores and are serially connected with a source of unidirectional current 73 and a biasing resistor 74 which serve to magnetically bias the cores 64 and 65. A pair of reference windings 75 and 76 are also wound on the cores 64 and 65 and serve as feedback windings. A pair of carrier windings 77 and 78 are also carried by cores 64 and 65. Rectifiers 79 and 80 with resistors 83 and 84 are serially connected to the carrier windings 77 and 78, respectively. One side of the load resistors 83 and 84 are directly interconnected and the other side of each load resistor is interconnected through a filtering network including a capacitor 85 and resistor 86. The output of the amplifier is developed across the terminals 87 and 88. Carrier power from a source, such as 89, furnishes the primary power to the magnetic amplifier and is applied across the terminals 90 and 91, and in turn through the windings 77 and 78, rectifiers 79 and 80, and load resistors 83 and 84. Where an analog system with feedback is desired, the carrier power frequency should be high compared to the input signal frequency. The frequency relationship should be at least 10:1 and where higher accuracy is desired the frequency relationship should be somewhat higher than 10:1.

Referring again to Figure 3, means for sequentially applying carrier power to each of the carrier windings whereby the input signals are successively sampled, amplified and delivered to the output terminals may be structurally and operationally identical to that described hereinbefore. The aforesaid means include gates 16a, 16b and 16c, gate control circuit 15 and leads 46, 47 and 48 interconnecting a separate output terminal of the gate control circuit with one input terminal of the gates. Thus, as the shift register 15 successively develops a pulse on lines 46, 47 and 48, amplifiers 56a, 56b and 56c will be successively energized in that order. The input signals continuously applied to the input windings of the magnetic amplifiers are successively amplified and switched to their respective output terminals and transferred over the leads 51, 54 and 55 to the common output lead 52. The signals appearing on lead 52 are applied to a conventional amplifier 63. Where an analog feedback system is utilized to produce a measurement of the input signals applied to the magnetic amplifiers, a converter is not required. The output of the amplifier is applied directly to the serially connected reference windings of each magnetic amplifier, and the reference current is automatically adjusted to match the unknown currents flowing from the signal sources. So long as the ampere turns of the signal source being sampled are not matched, the output from the particular magnetic amplifier will cause the reference current to change in such a direction as to match the signal source current.

Figure 5 is a schematic diagram of a pulsed type magnetic amplifier which is suitable for use in Figure 3 for producing digital measurements. This magnetic amplifier performs the functions of a null detector in the feedback system. It differs from the magnetic amplifier of Figure 4 in that a bit of information is obtained for each cycle of the carrier frequency rather than averaging the effect of a large number of cycles. For each cycle of the carrier signal, an output pulse is produced by the particular amplifier that is energized whose polarity depends upon the net input from the signal source and feedback signals. This output pulse is amplified and controls a converter which in turn provides a feedback current to balance the signal input current.

The magnetic amplifier illustrated in Figure 5 is described in detail in my copending application, Serial No. 669,336, filed July 1, 1957. Briefly, however, it includes a pair of cores 101 and 102, carrier windings 103 and 104 associated with cores 101 and 102, respectively, an input winding 105, a feedback winding 106, output winding 107, and compensating winding 108.

Winding 108 is added to permit compensation for any variations that exist in the manufacture of the cores. A bias battery 109 and control resistor 110 are connected in circuit with winding 108 and provide an initial balancing current. This balancing current is adjusted experimentally to give zero output voltage when zero current is flowing through windings 105 and 106. Carrier power for each magnetic amplifier is controlled by its associated gate and the gate control circuit. As the current in the carrier winding builds up toward a maximum value (during one cycle), cores 101 and 102 saturate. Due to the flux change, an electromotive force is induced in each winding on these cores. If the E.M.F. induced due to each core is the same, then the common windings 105, 106, 107 and 108 will have no net voltage. However, the presence of a D.C. current in input winding 105 will unbalance the two cores and a net voltage will appear across output winding 107. When the current flowing in feedback winding 106 exactly matches the current flowing in input signal winding 105, zero output voltage will be produced across output winding 107. The polarity of the voltage developed across winding 107 as a result of current flowing in winding 105 and 106 will depend upon the net value of those currents.

For example, a positive output pulse from winding 107 which is applied to the common output terminal 52 and through amplifier 63 to the converter 62 will cause the converter to increase current while a negative output pulse from winding 107 would cause the converter to decrease current. In this way the output current from the converter which flows through winding 106 can be made systematically to approach the correct value to match the signal input current on winding 105 to any desired degree of accuracy.

Converter 62 shown in block diagram form in Figure 3 is actually a digital current source. Its output is a steady current whose value is determined by a digital register. Devices of this type are commercially available and commonly used in commercial instruments such as the Datrac, manufactured by Epsco Inc., of Cambridge, Massachusetts. The basic logic of this device is illustrated in more detail in Figure 6 and includes a pulse generator 110 which is connected between a common bus 111 and amplifier 63 by a lead 112. A series of identical "AND" gates 113a, 113b, 113c . . . 113n, one assigned to each digital channel, are provided and each has a pair of input terminals and a single output terminal. One input terminal of each gate is connected to the common bus 111; the other input terminal of each gate is connected to a separate output terminal of shift register 114. The single output terminal of each gate is connected to an associated flip-flop circuit such as 115a, 115b, 115c . . . 115n. These conventional flip-flop circuits have two conditions of stable equilibrium, which are commonly denoted the "1" condition and the "0" condition. As shown, a pair of leads are taken from each flip-flop circuit to an associated current switch, such as 118a, 118b, 118c . . . 118n. The outputs of each of the current switches are connected in parallel to a common line 119.

Each current switch is designed to deliver either an accurately predetermined current, or else zero current depending upon the command from its associated flip-flop. Suppose that full scale current was desired to be 100 milliamperes, and that the digital result was desired as a binary number, then current switch 118a, for example, would be designed to deliver 50 milliamperes. Current switch 118b would be designed to deliver 25 milliamperes, current switch 118c would deliver 12.5 milliamperes, etc., until enough current switches had been included to provide the smallest increment of current which was to be measured. For example, if there were 10 such switches, the last one would deliver 1/1024 of full scale which would be 0.0975 milliampere in this case.

When the circuitry of Figure 6 is used to provide the feedback current to a magnetic amplifier which is being sampled, the sequence of operations would be as follows. Assuming that the feedback current would be 65 milliamperes in order to exactly balance the current applied to the particular magnetic amplifier from the signal source, the converter must then pass 65 milliamperes through feedback winding 106 shown in Figure 5 in order to compensate for the D.C. current flowing through winding 105 from the signal source. By means of a pulse delivered by shift register 114, flip-flop 115a is set into its "1" state causing current switch 118a to pass 50 milliamperes of current to appear on lead 119 and through winding 106. Immediately after this 50 milliampere current has been established through winding 106, the carrier generator will cause an interrogating pulse to flow through windings 103 and 104. A positive output voltage will then appear across winding 107 and be applied through the common output terminal to amplifier 63 and then to the converter input. The 50 milliamperes flowing through winding 106 is inadequate to balance the signal input current and the positive pulse produced and applied to bus 111 will not reset flip-flop 115a. Thus, the 50 milliamperes produced by current switch 118a will continue to flow. At this time, shift register 114 moves over one notch to set flip-flop 115b into its "1" state and thereby turn on current switch 118b. Since current switch 118b is designed to produce 25 milliamperes of current there will now be 75 milliamperes flowing through winding 106, which is greater than the input signal. On the next cycle of the carrier, the output voltage developed across winding 107 will be negative, thereby resetting flip-flop 115b back into its "0" state and current switch 118b will be turned off thereby leaving only the 50 milliamperes of current developed by current switch 118a. The shift register will then move over one more notch and flip-flop 115c will be set into its "1" state. Current switch 118c will be turned on and add 12.5 milliamperes to give a total current through winding 106 of 62.5 milliamperes. Since the correct current is 65 milliamperes, the current flowing through winding 106 is smaller than the input current and the output pulse from winding 107 will be positive which is stated hereinbefore does not affect 115c. Thus, the full 62.5 milliamperes will continue to flow. This process is continued until enough iterations have been performed to give the required accuracy. At this time, the output intelligence will be available in two forms. The analog current flowing at 61 in Figure 3 is accurately proportional to the signal input current and the value of this current is available in digital form at the flip-flops 115a, 115b, 115c . . . 115n. It will be apparent, of course, that the digital intelligence may be recorded on magnetic tape or conveniently used for some other purpose.

Various current switching devices, such as those illustrated in Figure 6, are available. One circuit is illustrated in Figure 7 which may be utilized in the blocks 118a, 118b, 118c . . . 118n where terminal 125 is the current summing point that is connected to lead 119. As shown, the circuit includes electron tubes 126, 127 and 128. The anode of tube 126 is connected to terminal 125 whereas the anode of tube 127 is connected to a source of positive voltage. The anode of tube 128 is connected to the interconnected cathodes of tubes 126 and 127. A reference potential 129 is applied to the grid of tube 128 so that the voltage drop across resistor 130 and hence the current flow through the resistor will be substantially constant and independent of small variations in voltage at the anode of tube 128. The grids 131 and 132 of tubes 126 and 127, respectively, are connected to the plates of the flip-flop which controls the particular current switch. When grid 131 is at a high potential as determined by its associated flip-flop then grid 132 will be at a low potential thereby cutting off tube 127. Hence, the current which flows through resistor 130 must flow through tube 126 and into the summing junction 125. In the event that the current switch is to be turned off, grid 131 will be established at a low potential while grid 132 will be at a high potential. In this case all of the current flows through tube 127 and zero current flows to the summing junction 125. As mentioned hereinbefore other types of current switches are available and can be satisfactorily used.

While certain preferred embodiments of the invention have been specifically disclosed, it is understood that the invention is not limited thereto as many variations will be readily apparent to those skilled in the art and the invention is to be given its broadest possible interpretation within the terms of the following claims:

What I claim is:

1. In combination, a plurality of magnetic switching circuits, means continuously connecting a current source to an input winding of each of said circuits, an output terminal common to all of said switching circuits, means interconnecting said common output terminal to said magnetic switching circuits, a source of alternating current, means selectively connecting said source of current to windings of said switching circuits for sequentially deriving signals on said common output terminal, and means connecting said common output terminal to windings on said switching circuits to reduce toward a null condition the output signal developed by an energized switching circuit.

2. In combination, a plurality of magnetic switching circuits, means continuously connecting a current source to an input winding of each of said circuits, an output terminal common to all of said switching circuits, means interconnecting said common output terminal to said magnetic switching circuits, a source of alternating current, gating means connecting said source of current to windings of said switching circuits, a source of gating pulses, means connecting said source of gating pulses to said gating means for selectively actuating said switching circuits and thereby producing a sequence of output currents on said common output terminal, and means connecting said common output terminal to windings on said switching circuits to reduce toward a null condition the output signal developed by an energized switching circuit.

3. A system for sampling a plurality of independent input current sources and producing a measurement thereof comprising a plurality of magnetic switching circuits, means continuously connecting a current source to an input winding of each of said circuits, an output terminal common to all of said switching circuits, means interconnecting said common output terminal to said magnetic switching circuits, a source of carrier current, means selectively connecting said source of carrier current to windings of said switching circuits for sequentially deriving signals on said common output terminal, a digital current source connected between said common output terminal and feedback windings on said switching circuits, said digital current source being arranged to selectively adjust the current applied to said feedback windings to approach the magnitude of said input current source and including means for deriving a digital representation of said input current source.

4. A system for sampling a plurality of independent input current sources and producing a measurement thereof comprising a plurality of magnetic switching circuits, means continuously connecting a current source to an input winding of each of said circuits, an output terminal common to all of said switching circuits, means interconnecting said common output terminal to said magnetic switching circuits, a source of carrier current, means selectively connecting said source of carrier current to windings of said switching circuits for sequentially deriving signals on said common output terminal, a plurality of digital channels responsive to signals derived on said output terminal and connected in circuit with feedback windings of said switching circuits, each of said digital channels being arranged to generate a predetermined current upon actuation, and means selectively actuating said digital channels to produce currents in said feedback windings matching said input current sources.

5. A system for sampling a plurality of independent input current sources and producing a measurement thereof comprising a plurality of magnetic switching circuits, means continuously connecting a current source to an input winding of each of said circuits, an output terminal common to all of said switching circuits, means interconnecting said common output terminal to said magnetic switching circuits, a source of carrier current, means selectively connecting said source of carrier current to windings of said switching circuits for sequentially deriving signals on said common output terminal, a plurality of digital channels responsive to signals derived on said output terminal and connected in circuit with feedback winding of said switching circuits, each of said digital channels being arranged to generate a predetermined current upon actuation and means controlled by said source of carrier current for selectively actuating said digital channels to produce currents in said feedback windings matching said input current sources.

6. In combination, a plurality of magnetic switching circuits, means continuously connecting a current source to an input winding of each of said circuits, an output terminal common to all of said switching circuits, means interconnecting said common output terminal to said magnetic switching circuits, a source of alternating current, gating means connecting said source of current to windings of said switching circuits, a source of gating pulses, means connecting said source of gating pulses to said gating means for selectively actuating said switching circuits and thereby producing a sequence of output currents on said common output terminal, a plurality of digital channels responsive to signals derived on said output terminal and connected in circuit with feedback windings of said switching circuits, each of said digital channels being arranged to generate a predetermined current upon actuation, and means selectively actuating said digital channels to produce currents in said feedback windings matching said input current sources.

7. A system for sampling a plurality of input signals and producing a measurement thereof comprising a plurality of magnetic amplifiers constructed to produce positive or negative output pulses in accordance with the relative magnitude of an input signal and a feedback signal, means continuously connecting an input signal to a winding of each of said amplifiers, an output terminal common to all of said magnetic amplifiers, means interconnecting said common output terminal to said magnetic amplifiers, a source of carrier current, means selectively connecting said source of current to windings of said magnetic amplifiers for sequentially energizing said amplifiers and producing output pulses on said common output terminal, a digital current source connecting said common output terminal to windings on said magnetic amplifiers, said digital current source including a plurality of digital channels arranged to generate a predetermined current upon actuation when an output pulse of predetermined polarity is produced on said common output terminal, and means sequentially actuating said digital channels to produce currents in said feedback windings matching said input signals.

8. A system for sampling a plurality of input signals and producing a measurement thereof comprising a plurality of magnetic amplifiers constructed to produce positive or negative output pulses in accordance with the relative magnitude of an input signal and a feedback signal, means continuously connecting an input signal to a winding of each of said amplifiers, an output terminal common to all of said magnetic amplifiers, means interconnecting said common output terminal to said magnetic amplifiers, a source of carrier current, gating means connecting said source of current to windings of said magnetic amplifiers, a source of gating pulses, means connecting said source of gating pulses to said gating means for selectively actuating said magnetic amplifiers and thereby developing output pulses on said common output terminal, a digital current source connecting said common output terminal to windings on said magnetic amplifiers, said digital current source including a plurality of digital channels arranged to generate a predetermined current upon actuation when an output pulse of predetermined polarity is produced on said common output terminal, and means controlled by said source of carrier current sequentially actutaing said digital channels to produce currents in said feedback windings matching said input signals.

9. In a magnetic commutator, the combination of a plurality of pulsed type magnetic amplifiers each having at least one of a plurality of input windings, output windings, carrier windings, and serially connected feedback windings; a source of alternating current for driving said amplifiers into saturation during each cycle of said alternating current when said carrier windings are energized from said source; means connected to said carrier windings for selectively energizing the same in predetermnied time sequence from said alternating current source; each of said output windings producing a series of output pulses respectively for successive cycles of energization of its associated carrier winding and responsive to a net difference in analog input and feedback signals received respectively by its associated input and feedback windings, each of said output pulses having a polarity which is either positive or negative selectively in accordance with which of said input and feedback signals is the greater; and digital converter means interconnecting said output windings and said serially connected feedback windings and responsive to said polarity sense of said output pulses for generating said feedback signal and bringing the same into equality with the input signal of each input winding during the period of energization of its associated carrier winding.

10. In a magnetic commutator as in claim 9, said converter means including means for providing a digital representation of the value of each of the input signals.

11. In a magnetic commutator, the combination of a pulsed type magnetic amplifier having input, output, carrier, and feedback windings, a source of alternating current connected to said carrier winding for energizing the same and driving said amplifier into saturation during each cycle of said alternating current, said output winding producing a series of output pulses respectively for successive cycles of energization of said carrier winding and responsive to a net difference in analog input and feedback signals received respectively by said input and feedback windings, each of said output pulses having a polarity which is either positive or negative selectively in accordance with which of said input and feedback signals is the greater, and digital converter means interconnecting said output and feedback windings and responsive to said polarity sense of said output pulses for generating said feedback signal and bringing the same into equality with said input signal.

References Cited in the file of this patent

UNITED STATES PATENTS

| | | |
|---|---|---|
| 2,615,066 | Milne | Oct. 21, 1952 |
| 2,754,503 | Forbes | July 10, 1956 |
| 2,784,396 | Kaiser | Mar. 5, 1957 |
| 2,787,418 | MacKnight | Apr. 2, 1957 |
| 2,828,482 | Schumann | Mar. 25, 1958 |
| 2,850,725 | Beaumont | Sept. 2, 1958 |

OTHER REFERENCES

"Multichannel . . . System," Buckley, IRE Proceedings, January 1951, pages 36–38.